(12) United States Patent
Chalabi et al.

(10) Patent No.: US 10,318,564 B2
(45) Date of Patent: Jun. 11, 2019

(54) DOMAIN-SPECIFIC UNSTRUCTURED TEXT RETRIEVAL

(71) Applicant: Microsoft Technology Licensing, LLC, Redmond, WA (US)

(72) Inventors: Achraf Abdel Moneim Tawfik Chalabi, Cairo (EG); Eslam Kamal Abdel-Aal Abdel-Reheem, Cairo (EG); Sayed Hassan Sayed Abdelaziz, Redmond, WA (US); Yuval Yehezkel Marton, Seattle, WA (US); Michel Naim Naguib Gerguis, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 544 days.

(21) Appl. No.: 14/867,620

(22) Filed: Sep. 28, 2015

(65) Prior Publication Data
US 2017/0091313 A1    Mar. 30, 2017

(51) Int. Cl.
*G06F 17/30* (2006.01)
*G06F 16/33* (2019.01)
(Continued)

(52) U.S. Cl.
CPC ............ *G06F 16/334* (2019.01); *G06F 16/35* (2019.01); *G06F 16/951* (2019.01); *G06F 16/958* (2019.01); *G06N 20/00* (2019.01)

(58) Field of Classification Search
None
See application file for complete search history.

(56) References Cited

U.S. PATENT DOCUMENTS

| 6,076,088 A | 6/2000 | Paik et al. |
| 6,188,976 B1 | 2/2001 | Ramaswamy et al. |

(Continued)

FOREIGN PATENT DOCUMENTS

| WO | WO2003014975 | 2/2003 |
| WO | WO2007069244 | 6/2007 |

(Continued)

OTHER PUBLICATIONS

Craven, et al., "Learning to construct knowledge bases from the World Wide Web", In Artificial Intelligence, vol. 118, Issues 1-2, Apr. 2000, pp. 69-113.

(Continued)

*Primary Examiner* — Debbie M Le
(74) *Attorney, Agent, or Firm* — Schwegmann Lundberg & Woessner, P.A.

(57) ABSTRACT

Retrieving from the Internet unstructured text related to a specified domain is described. Training data is accessed; the training data comprises unstructured text related to the specified domain. A first classifier is trained using features of the training data. It is used to classify unstructured text having plurality of features, to obtain unstructured text examples related to the domain. The unstructured text examples are used to retrieve from the Internet similar examples which do not have at least some of the plurality of features. Optionally, a second classifier is trained using the similar examples. Additional unstructured text is retrieved from the Internet and the second classifier is used to label the additional unstructured text for domain relevance.

20 Claims, 6 Drawing Sheets

(51) Int. Cl.
  *G06N 20/00* (2019.01)
  *G06F 16/35* (2019.01)
  *G06F 16/951* (2019.01)
  *G06F 16/958* (2019.01)

(56) References Cited

U.S. PATENT DOCUMENTS

| | | | |
|---|---|---|---|
| 6,463,430 B1 | 10/2002 | Brady et al. | |
| 7,536,389 B1* | 5/2009 | Prabhakar | G06F 17/30864 |
| 7,941,421 B2 | 5/2011 | Tiyyagura | |
| 8,001,130 B2* | 8/2011 | Wen | G06F 17/30687 707/750 |
| 8,117,203 B2 | 2/2012 | Gazen et al. | |
| 8,185,528 B2* | 5/2012 | Tengli | G06F 16/95 707/736 |
| 8,352,386 B2* | 1/2013 | Chitiveli | G06N 20/00 706/12 |
| 8,412,652 B2* | 4/2013 | Yu | G09B 19/00 706/14 |
| 8,484,245 B2 | 7/2013 | Ha-Thuc et al. | |
| 8,504,490 B2 | 8/2013 | Nie et al. | |
| 8,560,485 B2 | 10/2013 | Labrou et al. | |
| 8,713,007 B1 | 4/2014 | Korolev et al. | |
| 8,768,960 B2 | 7/2014 | Hu et al. | |
| 8,788,436 B2* | 7/2014 | Mehta | G06F 17/30911 706/12 |
| 8,788,442 B1* | 7/2014 | Sculley, II | G06N 99/005 706/20 |
| 8,825,471 B2 | 9/2014 | Betz et al. | |
| 8,909,645 B2 | 12/2014 | Eden et al. | |
| 8,938,410 B2 | 1/2015 | Cafarella et al. | |
| 9,002,818 B2* | 4/2015 | Ozonat | G06F 17/30873 707/709 |
| 9,002,852 B2* | 4/2015 | Farahat | G06F 17/3089 707/740 |
| 9,177,289 B2 | 11/2015 | Roy et al. | |
| 9,256,422 B2* | 2/2016 | Grechanik | G06F 8/70 |
| 9,275,291 B2* | 3/2016 | Shulman | G06K 9/6254 |
| 9,703,861 B2* | 7/2017 | Brown | G06F 17/28 |
| 2003/0225763 A1* | 12/2003 | Guilak | G06F 17/30707 |
| 2007/0112756 A1 | 5/2007 | Wen et al. | |
| 2011/0022550 A1 | 1/2011 | Pennacchiotti et al. | |
| 2011/0029384 A1* | 2/2011 | Wei | G06F 3/0481 705/14.53 |
| 2012/0197862 A1 | 8/2012 | Woytowitz et al. | |
| 2013/0035931 A1 | 2/2013 | Ferrucci et al. | |
| 2013/0066870 A1 | 3/2013 | Somasundaran et al. | |
| 2013/0191915 A1 | 7/2013 | Antonakakis et al. | |
| 2014/0136280 A1* | 5/2014 | Farahat | G06Q 30/0202 705/7.31 |
| 2014/0278985 A1* | 9/2014 | Ramakrishnan | G06Q 30/0256 705/14.54 |
| 2014/0281878 A1* | 9/2014 | Golan | G06F 16/355 715/232 |
| 2015/0006333 A1 | 1/2015 | Silveira et al. | |
| 2015/0051900 A1 | 2/2015 | Kimelfeld et al. | |
| 2015/0154193 A1 | 6/2015 | Dave et al. | |
| 2015/0178273 A1 | 6/2015 | Hakkani-tur et al. | |
| 2015/0286629 A1 | 10/2015 | Abdel-reheem et al. | |
| 2016/0042276 A1 | 2/2016 | Lightner et al. | |
| 2016/0092557 A1 | 3/2016 | Stojanovic et al. | |
| 2016/0103823 A1* | 4/2016 | Jackson, Jr. | G06F 17/2705 704/9 |
| 2016/0179934 A1* | 6/2016 | Stubley | G06F 17/30401 707/722 |
| 2018/0039695 A1 | 2/2018 | Chalabi et al. | |

FOREIGN PATENT DOCUMENTS

| | | |
|---|---|---|
| WO | 2008074486 A2 | 6/2008 |
| WO | 2015077942 A1 | 6/2015 |

OTHER PUBLICATIONS

Gabrilovich, et al., "Computing Semantic Relatedness using Wikipedia-based Explicit Semantic", In Proceedings of International Joint Conference on Artificial Intelligence, Jan. 6, 2007, pp. 1606-1611.
Wang, et al., "Using Wikipedia for Co-clustering Based Cross-domain Text Classification", In Eighth IEEE International Conference on International Data Mining, Dec. 15, 2008, pp. 1085-1090.
Xiang, et al., "Bridging Domains Using World Wide Knowledge for Transfer Learning", IEEE Transactions on In Knowledge and Data Engineering, vol. 22, Issue 6, Jun. 2010, pp. 770-783.
Chakrabarti, Soumen, et al., "Enhanced hypertext categorization using hyperlinks" vol. 27, No. 2, Jun. 1, 1998, pp. 307-318.
PCT Search Report and Written Opinion dated Dec. 13, 2016 for corresponding PCT International Application No. PCT/US2012/052562, 13 pages.
"Second Written Opinion Issued in PCT Application No. PCT/US2016/052562", dated Dec. 11, 2017, 10 Pages.
"Open Information Extraction", Retrieved from: https://web.archive.org/web/20160310045636/http://ai.cs.washington.edu/projects/open-information-extraction, Jul. 17, 2016, 5 Pages.
Dingli, et al., "Automatic Semantic Annotation using Unsupervised Information Extraction and Integration", In Proceedings of SemAnnot Workshop, Oct. 23, 2003, 9 Pages.
Etzioni, et al., "Unsupervised named-entity Extraction from the Web: An Experimental Study", In Journal of Artificial Intelligence, vol. 165, Issue 1, Jun. 1, 2005, pp. 91-134.
Fader, et al., "Identifying Relations for Open Information Extraction", In Proceedings of the Conference on Empirical Methods in Natural Language Processing, Jul. 27, 2011, pp. 1535-1545.
Ji, et al., "Knowledge Base Population: Successful Approaches and Challenges", In Proceedings of the 49th Annual Meeting of the Association for Computational Linguistics: Human Language Technologies, vol. 1, Jun. 19, 2011, pp. 1148-1158.
Pande, et al., "Domain Specific Facts Extraction Using Weakly Supervised Active Learning Approach", In the Proceedings of the IEEE/WIC/ACM International Conferences on Web Intelligence and Intelligent Agent, Nov. 17, 2013, pp. 246-251.
Pasca, et al., "Organizing and Searching the World Wde Web of Facts-Step One:the One-Million Fact Extraction Challenge", In the Proceedings of the 21st National Conference on Artificial Intelligence, Jul. 16, 2006, pp. 1400-1405.
"International Search Report and Written Opinion Issued in PCT Application No. PCT/US2016/052732", dated Nov. 29, 2016, 14 Pages.
Qiu, et al., "Relation Extraction from Chinese News Web Documents Based on Weakly Supervised Learning", In the Proceedings of the International Conference on Intelligent Networking and Collaborative Systems, Nov. 4, 2009, pp. 219-225.
Rozenfeld, et al., "High-Performance Unsupervised Relation Extraction from Large Corpora", In Proceedings of the Sixth International Conference on Data Mining, Dec. 18, 2006, 6 Pages.
Sun, et al., "Semi-Supervised Relation Extraction with Large-Scale Word Clustering", In Proceedings of the 49th Annual Meeting of the Association for Computational Linguistics: Human Language Technologies, vol. 1, Jun. 19, 2011, pp. 521-529.
Yates, et al., "TextRunner: Open Information Extraction on the Web", In Proceedings of Human Language Technologies: The Annual Conference of the North American Chapter of the Association for Computational Linguistics: Demonstrations, Apr. 23, 2007, pp. 25-26.
"International Preliminary Report on Patentability Issued in PCT Application No. PCT/US2016/052562", dated Mar. 8, 2018, 10 Pages.
Charu Aggarwal and ChengXiang Zhai (Editors), Mining Text Data, Springer Press, 2012.†
Ian Ruthven and Mounia Lalmas. 2003. A survey on the use of relevance feedback for information access systems. Knowl. Eng. Rev. 18, Jun. 2, 2003, 95-145.†

\* cited by examiner
† cited by third party

US 10,318,564 B2

DOMAIN-SPECIFIC UNSTRUCTURED TEXT RETRIEVAL

BACKGROUND

The demand for fast and effective ways of retrieving relevant information is ongoing. Question-Answering systems which receive a question from a user by voice input or in other ways, and then return an answer (as opposed to a list of relevant Web pages or URLs) are increasingly used to retrieve facts and information. Search engines which receive text based queries also operate to return ranked lists of documents to users which are relevant to the query. Insight systems are available which operate in conjunction with other tasks, such as word processing or reading, which a user is engaged in and enable the user to quickly and simply retrieve facts and information which are relevant to the ongoing task. Many other types of information retrieval system are available, including those directed at enterprise workers or other communities of individuals where users are able to retrieve information from a knowledge system conceptually organized as a graph—with individuals, documents, and other entities as vertices, and the relations between them as arcs.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Examples describe retrieving unstructured text from the Internet related to a specified domain. For example, training data is accessed comprising unstructured text related to the specified domain. The training data has a plurality of features. A first classifier is trained using the training data and used to classify unstructured text having the plurality of features, to obtain unstructured text examples related to the domain. The unstructured text examples are used to retrieve similar examples from the Internet which do not have at least one of the plurality of features.

In some examples, a second classifier is trained using the similar examples. Additional unstructured text is retrieved from the Internet and the second classifier is used to classify the additional unstructured text as being related to the specified domain or not. However, it is not essential to use a second classifier.

In this way huge amounts (millions) of unstructured text examples may be retrieved which relate to the specified domain, and together form a domain-specific corpus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As mentioned in the background section there is ongoing demand for fast and effective ways of retrieving relevant information. To address this information retrieval systems 118 of many types, use data from one or more knowledge stores 116. A knowledge store is a repository comprising: entities, relations between these entities, and entity properties. A knowledge store has a schema called an ontology, this ontology is the skeleton of the knowledge store and defines the specifications of the entities in terms of their classes, and hierarchy and also defines the possible properties for each class of entities and the relationships between different entity classes. A knowledge store can be thought of a graph, where the nodes are entities, and these nodes are connected by edges, which are the relationships and properties. Nodes represent named entities (people, places, events, objects) and edges represent relation instances (such as factual statements about named entities).

In some cases information retrieval systems are configured to obtain data directly from knowledge stores by applying queries to the knowledge store to retrieve facts and/or named entities. This is achieved by using a search algorithm to search the knowledge store in a well-known manner. In other cases information retrieval systems are enhanced by using data from knowledge stores for purposes such as query suggestion, query modification, query disambiguation, document index enhancement, merging results from the knowledge store with results from other sources. Where information retrieval systems use enterprise graphs comprising nodes representing individuals and documents, the knowledge store can be used to annotate nodes of the graph with facts and/or named entity data. Search queries applied to the enterprise graph use the annotations to retrieve relevant results.

Previously, knowledge stores have been populated using data manually obtained by human judges which is expensive and time consuming. Knowledge stores have also been populated using data which is already labelled as belonging to a particular domain and having a structured format, for example, web pages with tables and lists, and which are known in advance to belong to a particular domain. However, these types of web pages are very limited in number and so it is difficult to create a comprehensive, accurate and up-to-date knowledge store 116 when relying on such sources only.

Figure 1:
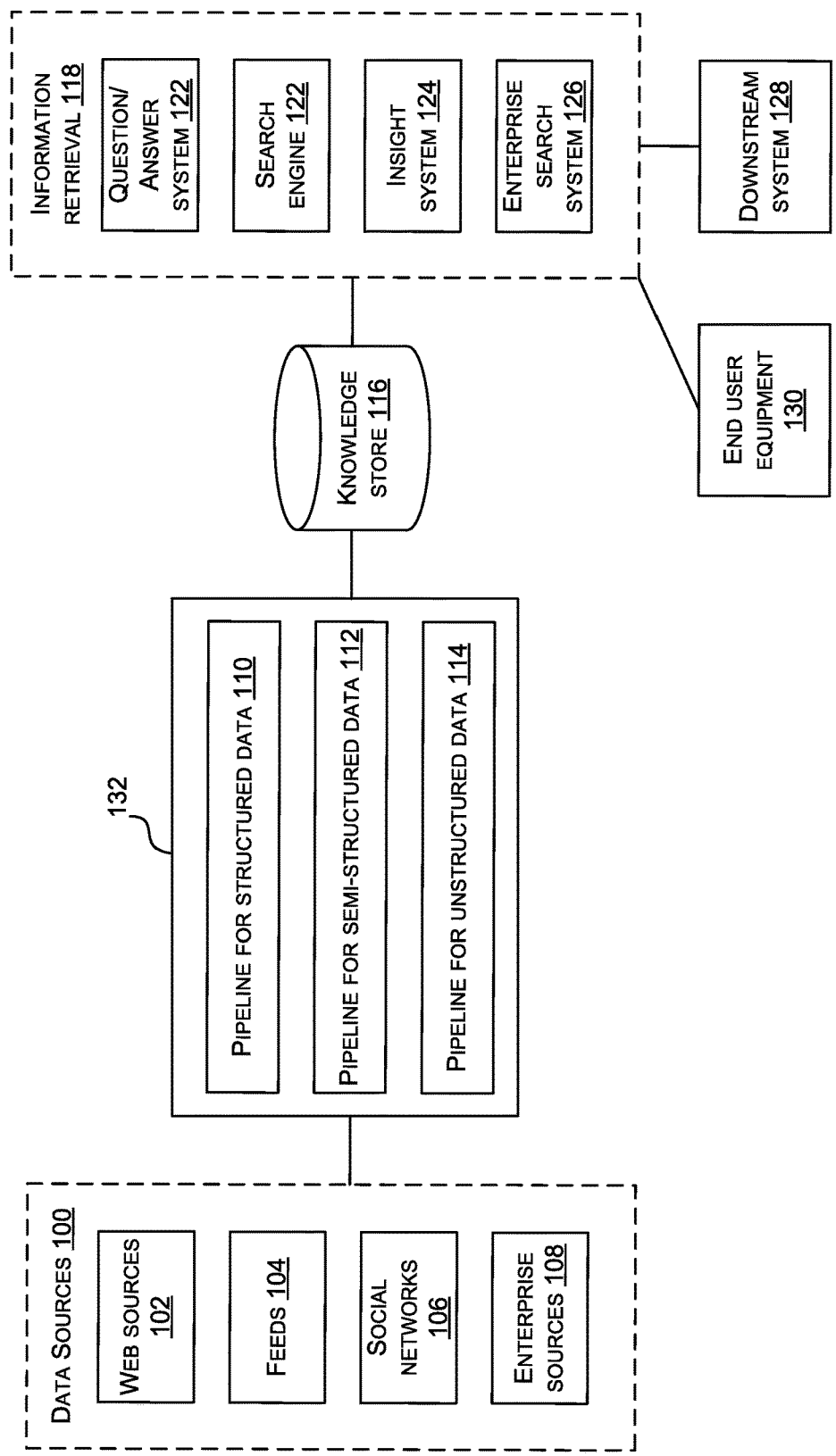
FIG. 1 is a schematic diagram of a data ingestion pipeline which inputs data to a knowledge store.

FIG. 1 is a schematic diagram of a data ingestion pipeline 132 for inputting data to a knowledge store 116. The data ingestion pipeline extracts knowledge from input data sources 100 such as web sources 102 (web pages, blogs, forums), data feeds 104 (such as news feeds, weather feeds and other data feeds), social network data 106 (such as social network sources, social network web pages), enterprise sources 108 (such as intranet databases, emails, shared document systems, calendar data). The data sources comprise structured data, semi-structured data, and unstructured data and these types of data are handled by separate individual pipelines within the data ingestion pipeline 132. By handling these types of data in different pipelines it is possible to populate the knowledge store 116 more efficiently because each pipeline can be tailored to deal with the particular type of data. Structured data is data which is stored in a known format such as data in a database, excel sheet, calendar or other known format. An example of structure data may be data in a relational database where the schema of the database is known. Semi-structured data is data which is stored in a partially known format, such as data from web pages following a consistent structure or data in tables where the structure of the table is not pre-defined but consistent across multiple pages, and hence can be easily inferred. Unstructured data is data which is stored in an unknown format, also called free text format. A non-exhaustive list of examples of unstructured data is: news feed text, text from product web pages, blog text, social media message text, text from email messages, text from forums, text from documents, text from the majority of web pages. The examples in this document are concerned with unstructured data, and specifically unstructured text.

As illustrated in FIG. 1 the data ingestion pipeline 132 accesses data from data sources 100 and extracts facts and/or named entities from the input data. The facts and named entities are used to populate a knowledge store 116 for example, by filling slots in the knowledge store with new values and new relation instances. The data ingestion pipeline 132 is also arranged to develop, augment and maintain the knowledge store, for example, by proposing additions to the ontology, such as new entity classes, new relations, new attributes. The data ingestion pipeline 132 is also arranged to refresh data in the knowledge store by replacing existing items in the knowledge store with fresher data.

The knowledge store is accessible by information retrieval systems 118 such as question answer systems 122, search engines 122, insights systems 124, enterprise search systems 126 and others. End user equipment 130 such as tablet computers, wearable computers, smart phones, laptop computers, desktop computers and others are able to access services of the information retrieval systems 118 in order to obtain data from knowledge store 116. Downstream systems 128 can also access the information retrieval systems 118 to access the data of the knowledge store 116. Examples of downstream systems include robotic systems, manufacturing control systems, workflow planning systems, and others. For example, an information retrieval system 118 receives a query from an end user equipment 130 or downstream system 128 where the query is a name of a person. The query is used to search the knowledge store using any suitable search process to find nodes related to the named entity (person's name) and the contents of the node (and optionally related nodes) is returned. The node contents may be used to fill a named entity chart which is returned to the user equipment for display on a results page. The results page may also comprise ranked results retrieved from an index of pages and/or other types of information retrieval results relevant to the query.

The data ingestion pipeline may be implemented using software and/or hardware.

Figure 2:
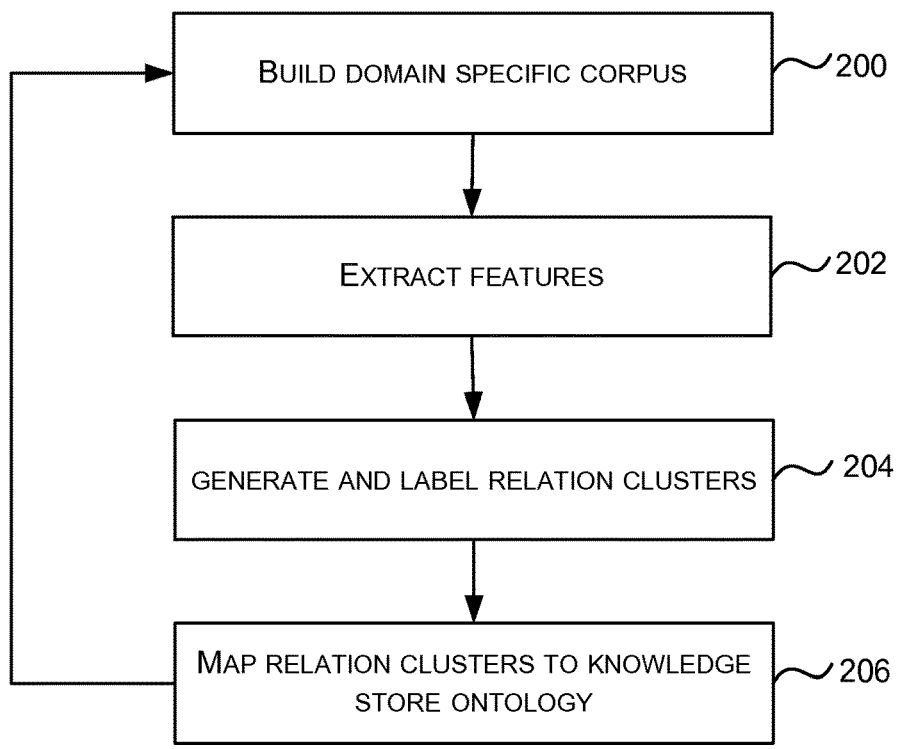
FIG. 2 is a high-level flow diagram of a method at the pipeline for extracting knowledge from unstructured data of FIG. 1.

FIG. 2 is a flow diagram of a method of the pipeline for unstructured data of FIG. 1. The pipeline for unstructured data uses a computer-implemented process to build 200 a domain-specific corpus. For example, an operator specifies a domain such as "Formula One motor racing" and the pipeline operates to populate, augment and refresh the knowledge base with facts and named entities about formula one motor racing. A corpus is a plurality of documents, in this case where the documents comprise unstructured text which has been retrieved from the Internet. Because the text is retrieved from the Internet it is possible to retrieve huge (tens or hundreds of millions) of documents provided the process of building the domain-specific corpus is able to properly scale up. Achieving this scalability is a significant challenge especially where the data is unstructured because it is difficult to compute whether retrieved unstructured data is specific to a particular domain in a fast, efficient manner.

In some examples, all or part of the process of FIG. 2 may be exposed as a web service so that users of the web service are able to specify a domain and create a domain-specific corpus. In some examples the web service enables users to create and/or populate knowledge bases with facts and named entities extracted from the domain-specific corpus.

The process of FIG. 2 begins with an automated process for building 200 a domain-specific corpus of unstructured text documents as mentioned above. Features are extracted 202 from the domain-specific corpus as described in more detail below using computer implemented processes and using the features, facts are extracted, then clustered based on their relations, clusters of the facts in the corpus are generated 204 and labeled. For example, for the domain "formula one motor racing" a cluster may contain facts for F1 drivers winning a FormulaOne race. The clusters are then mapped to the knowledge store 206. For example, the labels of the clusters may not correspond in a one to one relationship with the classes of the knowledge store and so a mapping is computed and applied.

Figure 3:
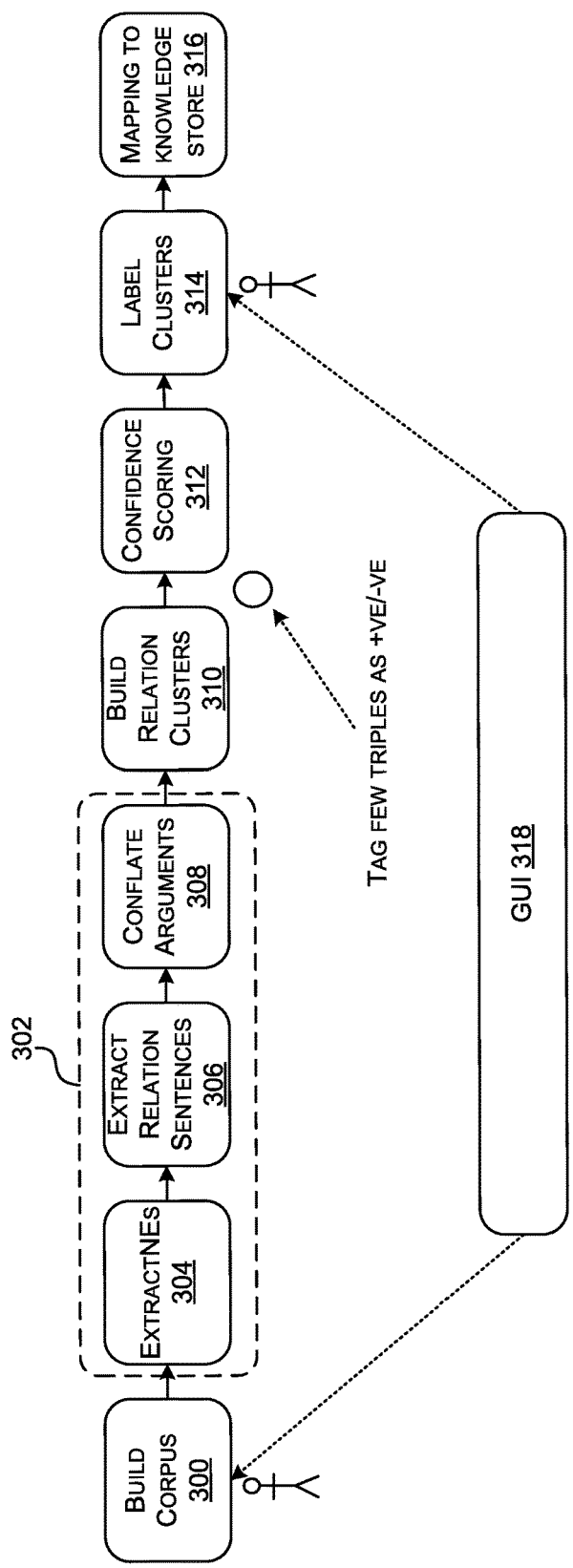
FIG. 3 is a schematic diagram of the pipeline for extracting knowledge from unstructured data of FIG. 1 in more detail.

FIG. 3 is a schematic diagram of an example of the process of FIG. 2 in more detail. A corpus of domain-specific unstructured text document is built 300 as mentioned above. Features are then extracted 302 for example, by extracting named entities 304, extracting relation sentences 306, and conflating arguments 308. The named entities can be extracted by identifying words or groups of words in the unstructured text by classifying the words/groups of words as being named entities or not using a trained classifier. The process of identifying relation sentences 306 comprises analyzing the structure of sentences in the unstructured text using syntactic analysis and then using rules and patterns to determine which of the sentences are likely to comprise facts. For example, sentences comprising a named entity are more likely to comprise a fact about the named entity than sentences which do not comprise a named entity. The process of conflating arguments comprises identifying different words or groups of words which specify the same named entity. For example, "Gates", "Bill Gates", "BG" and "Bill William Gates" are conflated to "Bill Gates".

The feature extraction process 302 outputs candidate facts. A build relation clusters process 310 computes clusters of these facts to group similar relation facts into the same cluster, using any suitable clustering process such as k-means, agglomerative clustering or others. For example, a cluster of sentences with facts about "People—Founded—Company" or "company founders" may be computed.

Confidence scoring process 312 computes confidence values for the facts in the clusters indicating how confident it is that the fact is true. The confidence score may be computed as an output of a trained classifier, using features of the sentences, using rules or in other ways. For example, confidence scores may take into account credibility/obscurity of a web site from which the sentence was extracted. Sentences with low confidence are omitted.

The relation clusters of facts may be labelled 314 with the corresponding ontology relation/predicate using a fully automated process, or using human judges in whole or in part. In the case that human judges are used a graphical user interface 318 presents the unstructured text corpus 300 and the clusters of facts 314 to a user who is able to label the clusters.

The labeled clusters of facts are mapped to the knowledge store 316 so populating the knowledge store with more data or updating the knowledge store. In this process facts from the pipeline are associated with defined concepts in the knowledge store. For example, facts in a cluster labelled "founded company" may be mapped to the node for "created enterprise" in the knowledge store.

Figure 4:
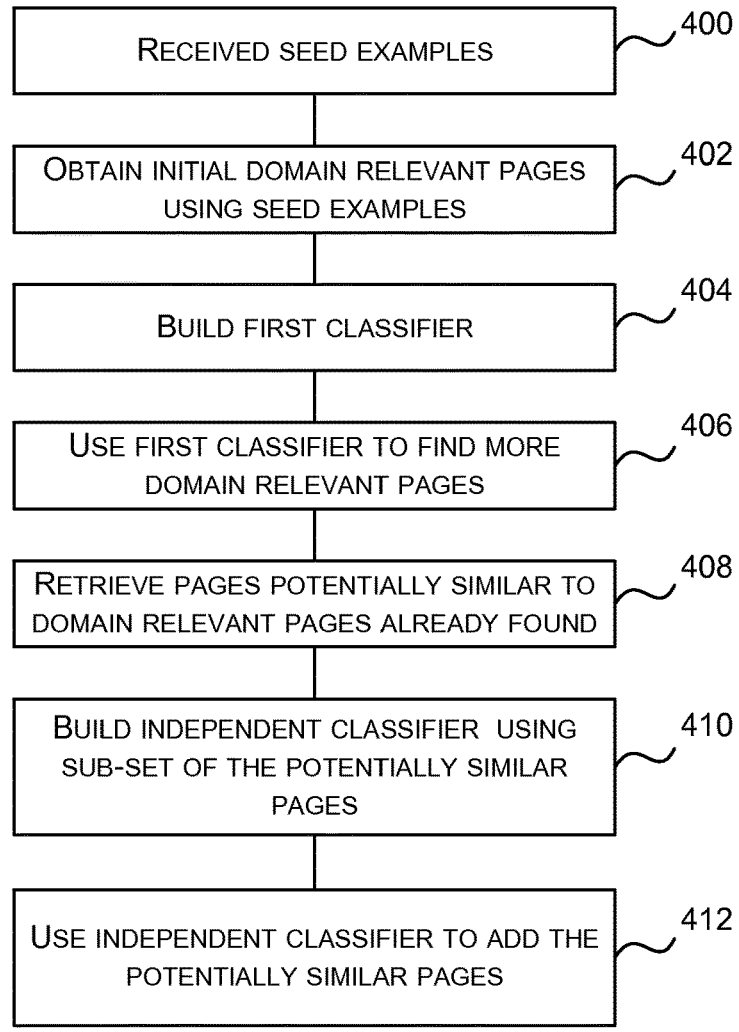
FIG. 4 is a flow diagram of a method of building a domain-specific corpus, which is a detailed example of process 300 of FIG. 3.

More detail about the process of building the domain-specific corpus 300 is now given with reference to FIG. 4.

Seed examples are received 400 from an operator or an automated process. The seed examples are named entities or events which are in the domain that it is desired to build a corpus for. Suppose it is desired to build a corpus of unstructured text documents about the domain "formula one motor racing". Seed examples may be names of drivers, names of teams, names of races and so on.

The seed examples are used to obtain 402 initial domain-relevant pages. For example, the seed examples are input as queries to an online public encyclopedia which returns ranked lists of documents such as web pages. These web pages are relevant to the domain because of the queries used. Also the web pages comprise reliable content which is in a consistent format because the online encyclopedia is from a credible source, and/or has web pages with facts that are backed up with references to other documents and authors. Note that it is not essential for the encyclopedia to be online or for it to be public.

The initial domain-relevant pages are used as training data to build 404 a first classifier. For example, features are extracted from the initial domain-relevant pages such as a category of the page, the title of the page, metatags of the page, features of the first few sentences of the web page, information box features of the page, and other features. The web pages along with these features constitute the positive training data to train the first classifier. Other negative training data may be available comprising features of unstructured text which is not relevant to the domain. The model of the first classifier is trained using the training data. For example, the first classifier may comprise any one or more of: a neural network, a support vector machine, a naive Bayes classifier, other machine learning classifier. The first classifier may be iteratively trained by training using a first subset of the training data, and then training with an incrementally augmented set of the training data and iterating this process until little or no improvement in classification performance is observed.

The first classifier, which has been trained, is then used 406 to find more domain-relevant pages. For example, by retrieving web pages from the online encyclopedia, or any other web pages which have the features used by the first classifier, and labeling the retrieved pages as being relevant to the domain or not. In this way the number of domain-relevant pages is significantly increased.

The process now scales up by retrieving 408 web pages from the whole Internet where the pages have unstructured text without at least some of the features used by the first classifier. This increases the potential sources of unstructured text enormously. (For example, the web pages are retrieved from many sources available on the Internet rather than from one specific online encyclopedia or other source where pages have rich features.) The web pages which are retrieved are candidates for being domain-relevant pages.

Various different ways of retrieving pages from the Internet which are similar to the domain-relevant pages already found may be used either alone or in combination. Examples of different ways of retrieving similar pages include use of inbound hyperlinks, use of click logs, use of impression logs, use of document similarity techniques. Combinations of one or more of these methods may be used. An inbound hyperlink is a reference in another web page to the current web page. An impression log is a collection of document links shown to users in response to some query. A click log is a collection of document links which have been clicked by users when shown in response to some query.

In the case that inbound hyperlinks are used, the domain-relevant pages which have already been found are checked to find any inbound hyperlinks. This may be done in a very efficient manner by looking up the pages in an index of an information retrieval system which already has information about inbound hyperlinks. The web pages in which the inbound hyperlinks originate are directly retrieved from the web. The inbound hyperlink process may be repeated or cascaded to exponentially increase the number of candidate pages. Starting from a current web page an inbound hyperlink identifies an originating web page. The originating web page may itself have an inbound hyperlink from another web page and so on.

In the case that click logs are used, the domain-relevant pages which have already been found are identified in the click logs and any pages which co-occur in the log for the same query are retrieved. In the case that impression logs are used, the domain-relevant pages which have already been found are identified in the impression logs. Any pages which co-occur in the log for the same query are retrieved.

Another way of retrieving similar web pages is to compute a similarity score between web pages on the basis of content features of the web pages. However, this is relatively time consuming and complex as compared with using inbound hyperlinks or click/impression logs. In order to achieve a scalable deployment which can retrieve tens or hundreds of millions of web pages, the processes use inbound hyperlinks and/or click/impression logs.

The domain-relevant candidate pages may be assigned a confidence value indicating a likelihood that the page is relevant to the domain. For example, the confidence value is computed based on the number of hyperlinks from a candidate page to known domain-relevant pages. In another example, the confidence value is computed based on the weights of the metatags extracted from the candidate page.

In some examples, a second classifier is built 410 to classify unstructured text from the Internet as being domain-relevant or not. However, it is not essential to use a second classifier. In some cases the first classifier is used together with a similar web page retrieval module to retrieve similar web pages. Confidence values are assigned to the similar web pages as described above.

The unstructured text is from web pages which do not have at least some of the features used by the first classifier. The second classifier is trained using unstructured text from the candidate domain-relevant web pages extracted from sources different than the public online encyclopedia, and so it is generally independent of the first classifier. The second classifier is trained on a subset of the unstructured text selected according to the confidence values. The second classifier may be iteratively trained as mentioned above with respect to the first classifier. The second classifier is used to identify 412 candidate web pages (found from the inbound hyperlinks or other retrieval process) which do belong to the domain.

The second classifier is harder to build than the first classifier because it uses a poorer feature set, because the web pages it is trained on typically have no categories, information boxes, domain-relevant rich first sentences, meta-tags and other features of online encyclopedia pages. Therefore the second classifier is trained with more training data than the first classifier.

In addition a filter may be applied to filter out documents which are not in a specified language. Candidate pages from which unstructured text cannot be extracted, or which contain no unstructured text, may be omitted.

In this way tens or hundreds of millions of unstructured text pages are identified which are relevant to a specified domain. The text pages form a domain-specific corpus which can be used in the process of FIG. 3 to populate a knowledge base and facilitate information extraction.

Figure 5:
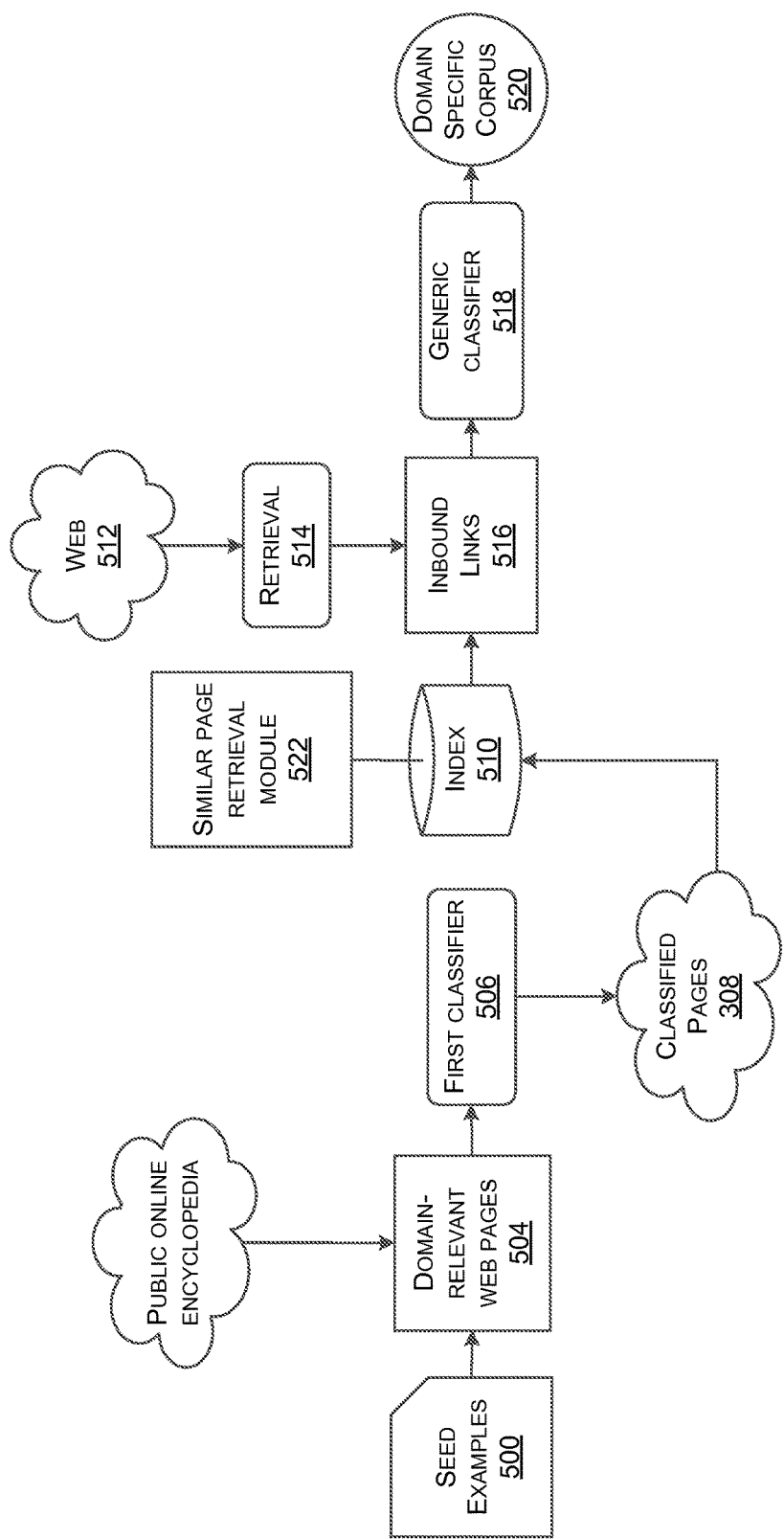
FIG. 5 is a schematic diagram of apparatus for building a domain-specific corpus in a weakly-supervised way.

FIG. 5 is a schematic diagram of apparatus for building a domain-specific corpus 520. The apparatus comprises a first classifier 506, a second classifier 518 (referred to as a generic classifier in this example), and a similar page retrieval module 522. In this example the similar page retrieval module 522 uses an index 510 of an information retrieval system. The index itself may be accessed by the similar page retrieval module 522 over a communications network and so may be separate from the apparatus.

Seed examples 500 comprising named entities relevant to the domain are input and used to retrieve domain-relevant web pages 504 from an online encyclopedia 502. These pages are used to train a first classifier 506. The first classifier is of any type as described with reference to FIG. 4. The first classifier is applied to the other web pages of the online encyclopedia 502 to produce classified pages 308.

The classified pages 308 are used by a similar page retrieval module 522 to find similar pages from the Web. The similar page retrieval module uses any of the methods described with reference to box 408 of FIG. 4.

In an example where inbound hyperlinks are used, the classified pages 308 are looked up in an index 510 which has inbound links of the classified pages 308. The inbound links 516 are used by module 522 to retrieve web pages from the web 512 (such as the Internet or intranet) using retrieval system 514. Retrieval system 514 rejects web pages with no unstructured text. Confidence values are assigned to the retrieved pages (by module 522) on the basis of the number of inbound hyperlinks, and based on the strength of the extracted signals/features on these pages.

A sub-set of the pages retrieved by retrieval system 514 is used to train a second classifier 518 which may be independent of first classifier 506 and which uses a different feature set than the one used in the first classifier 506. The sub-set of the pages may be selected according to confidence values of the pages, indicating likelihood that the pages are domain-relevant. The generic classifier classifies unstructured text as being domain-relevant or not. The second classifier may be iteratively trained as mentioned above with respect to the first classifier, using incremental subsets of the unstructured text retrieved from the web 512.

The second classifier, once trained, is used to label the web pages retrieved by retrieval system 514 to obtain domain-relevant unstructured text. The domain-relevant unstructured text is stored in corpus 520.

The functionality of the components of FIGS. 1, 3 and 5 can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 6:
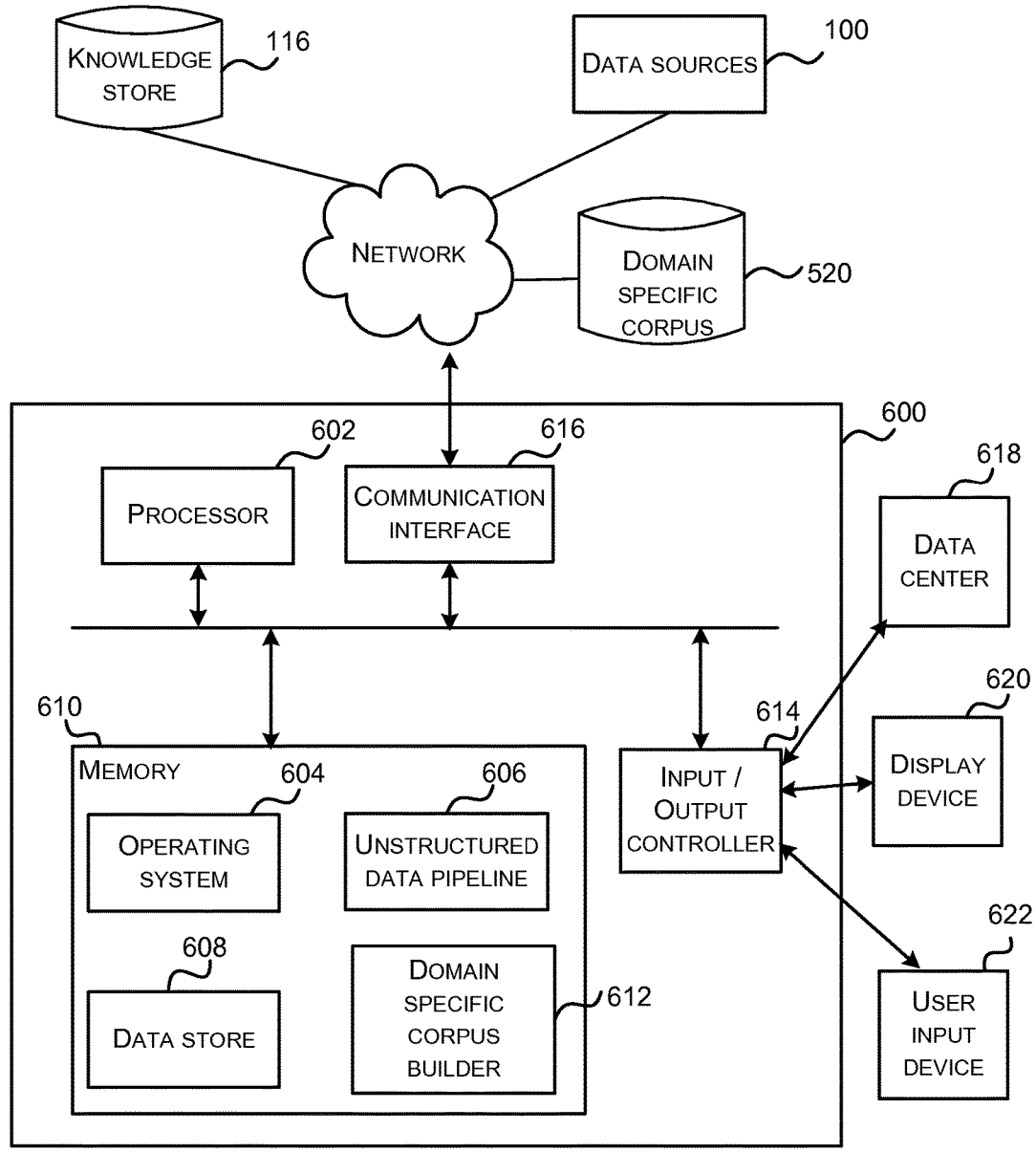
FIG. 6 illustrates an exemplary computing-based device in which embodiments of a pipeline for unstructured data may be implemented.

FIG. 6 illustrates various components of an exemplary computing-based device 600 which may be implemented as any form of a computing and/or electronic device, and in which embodiments of a pipeline for ingesting unstructured text from data sources 100 on the Internet or intranet to a knowledge store 116 may be implemented. The pipeline may comprise a domain-specific corpus builder 612 to retrieve unstructured text from one or more of the data sources 100 which is specific to a specified domain in order to create a domain-specific corpus 520.

Computing-based device 600 comprises one or more processors 602 which may be microprocessors, controllers or any other suitable type of processors for processing computer executable instructions to control the operation of the device in order to generate a domain-specific corpus 520 and optionally to populate, update and curate a knowledge store 116 using the domain-specific corpus. In some examples, for example where a system on a chip architecture is used, the processors 602 may include one or more fixed function blocks (also referred to as accelerators) which implement a part of the method of any of FIGS. 2, 3, 4, 5 in hardware (rather than software or firmware). Platform software comprising an operating system 604 or any other suitable platform software may be provided at the computing-based device to enable application software to be executed on the device. An unstructured data pipeline 606 such as that of FIG. 1 may be present at the computing device 600 in some examples. A domain-specific corpus builder 612 is present at the computing device 600 and is part of the unstructured data pipeline 606 when that pipeline is present. The domain-specific corpus builder 612 is implemented using software and/or hardware. The domain-specific corpus builder comprises a first classifier (such as first classifier 506 of FIG. 5, a second classifier (such as generic classifier 518 of FIG. 5) and a module for retrieving similar web pages given domain-relevant input web pages (such as module 522 of FIG. 5)

The computer executable instructions may be provided using any computer-readable media that is accessible by computing based device 600. Computer-readable media may include, for example, computer storage media such as memory 610 and communications media. Computer storage media, such as memory 610, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 610) is shown within the computing-based device 600 it will be appreciated that the storage may be distributed or located remotely and accessed via a network or other communication link (e.g. using communication interface 616).

The computing-based device 600 also comprises an input/output controller 614 arranged to output display information to a display device 620 which may be separate from or integral to the computing-based device 600. The display information may provide a graphical user interface. The input/output controller 614 is also arranged to receive and process input from one or more devices, such as a user input device 622 (e.g. a mouse, keyboard, camera, microphone or other sensor). In some examples the user input device 622 may detect voice input, user gestures or other user actions and may provide a natural user interface (NUI). This user input may be used to specify a domain, specify features to be used by the first and/or second classifiers, specify data sources, configure parameters of the classifiers and for other reasons. In an embodiment the display device 620 may also act as the user input device 622 if it is a touch sensitive display device. The input/output controller 614 may also output data to devices other than the display device, e.g. a locally connected printing device.

Any of the input/output controller 614, display device 620 and the user input device 622 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example there is an apparatus for retrieving unstructured text from the Internet related to a specified domain comprising:

a first classifier having been trained using training data comprising unstructured text related to the specified domain the training data having a plurality of features;

a similar web page retrieval module configured to retrieve web pages from the Internet which do not have at least some of the plurality of features, and where the retrieved web pages are similar to web pages classified by the first classifier;

a second classifier having been trained using unstructured text examples which do not have at least one of the plurality of features;

wherein the second classifier is configured to label web pages retrieved by the similar web page retrieval module to select web pages which are relevant to the specified domain.

For example, the similar web page retrieval module is configured to assign confidence values to the similar web pages to indicate likelihood of being relevant to the specified domain and wherein the second classifier has been trained using unstructured text examples from web pages retrieved by the similar web page retrieval module and selected according to confidence values.

For example, the similar web page retrieval module identifies the similar web pages from inbound links of web pages classified by the first classifier.

For example, the similar web page retrieval module identifies first similar web pages from inbound links of web pages classified by the first classifier and from inbound links of first similar web pages.

For example, the similar web page retrieval module accesses an index of web pages, the index comprising inbound link data of the indexed web pages.

For example, the similar web page retrieval module accesses a click log comprising a record of web pages observed as having been selected by different users in connection with a same query.

For example, the similar web page retrieval module accesses an impression log comprising a record of web pages occurring in results lists returned by an information retrieval system in response to a same query.

For example, the similar web page retrieval module is configured to assign a confidence value to a similar web page on the basis of a number of inbound links of the similar web page.

For example, the first classifier is configured to use features comprising one or more of: a category of a web page, a title of a web page, metatags of a web page, an information box of a web page.

For example, the first classifier is configured to classify web pages of a public online encyclopedia as being relevant to the specified domain or not.

For example, the first classifier has been trained using training data retrieved from a source known to comprise web pages having the plurality of features and using queries comprising seed examples.

In an example the apparatus has a communications interface configured to enable the apparatus to be accessed as a web service.

In an example the apparatus has a feature extractor configured to extract sentences from the web pages retained by the second classifier, where the extracted sentences are likely to comprise facts.

In an example the apparatus has a clustering component configured to cluster the extracted facts into relation clusters and assign confidence values to the clusters' facts.

In an example the apparatus has a mapping component configured to map the relation clusters of extracted facts to an ontology of a knowledge store.

In an example there is a computer-implemented method of retrieving unstructured text from the Internet related to a specified domain, the method comprising:

accessing training data comprising unstructured text related to the specified domain, the training data having a plurality of features;

training a first classifier using the training data;

using the trained first classifier to classify unstructured text having the plurality of features, to obtain unstructured text examples related to the domain;

using the unstructured text examples to retrieve similar examples from the Internet which do not have at least one of the plurality of features;

training a second classifier using at least some of the similar examples, retrieving additional unstructured text from the Internet;

using the second classifier to classify the additional unstructured text as being related to the specified domain or not.

For example, the method comprises assigning confidence values to the similar web pages to indicate likelihood of being relevant to the specified domain and training the second classifier using web pages selected according to the confidence values.

For example the method comprises identifying the similar web pages from inbound links of web pages classified by the first classifier.

For example the method comprises identifying the similar web pages from a cascade of inbound links of web pages classified by both the first and the second classifiers.

In an example there is an apparatus for retrieving unstructured text from the Internet related to a specified domain comprising: a first classifier having been trained using training data comprising unstructured text related to the specified domain the training data having a plurality of features; and a similar web page retrieval module configured to retrieve web pages from the Internet which do not have at least some of the plurality of features, and where the retrieved web pages are similar to web pages classified by the first classifier, the similar web page retrieval module being configured to assign confidence values to the similar web pages to indicate likelihood of being relevant to the specified domain.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus for retrieving unstructured text from the Internet related to a specified domain, the apparatus comprising:
   one or more processors; and
   a memory having instructions stored therein, the instructions executable by the one or more processors to perform operations as
      a first classifier having been trained using training data comprising unstructured text related to the specified domain, the training data having a plurality of features, the unstructured text being separated from structured data and semi-structured data;
      a similar web page retriever configured to retrieve, from the Internet, only web pages that include text that is unstructured and do not have at least some of the plurality of features of the training data, and where the retrieved web pages are similar to web pages classified by the first classifier; and
      a second classifier having been trained using unstructured text examples which do not have at least one of the plurality of features;
      wherein the second classifier is configured to label web pages retrieved by the similar web page retriever to select web pages which are relevant to the specified domain.

2. The apparatus of claim 1 wherein the similar web page retriever is configured to assign confidence values to the similar web pages to indicate likelihood of being relevant to the specified domain and wherein the second classifier has been trained using unstructured text examples from web pages retrieved by the similar web page retriever and selected according to confidence values.

3. The apparatus of claim 1 wherein the similar web page retriever identifies the similar web pages from inbound links of web pages classified by the first classifier.

4. The apparatus of claim 1 wherein the similar web page retriever identifies first similar web pages from inbound links of web pages classified by the first classifier and from inbound links of first similar web pages.

5. The apparatus of claim 1 wherein the similar web page retriever accesses an index of web pages, the index comprising inbound link data of the indexed web pages.

6. The apparatus of claim 1 wherein the similar web page retriever accesses a click log comprising a record of web pages observed as having been selected by different users in connection with a same query.

7. The apparatus of claim 1 wherein the similar web page retriever accesses an impression log comprising a record of web pages occurring in results lists returned by an information retrieval system in response to a same query.

8. The apparatus of claim 1 wherein the similar web page retriever is configured to assign a confidence value to a similar web page on the basis of a number of inbound links of the similar web page.

9. The apparatus of claim 1 wherein the first classifier is configured to use features comprising one or more of: a category of a web page, a title of a web page, metatags of a web page, an information box of a web page.

10. The apparatus of claim 1 wherein the first classifier is configured to classify web pages of a public online encyclopedia as being relevant to the specified domain or not.

11. The apparatus of claim 1 wherein the first classifier has been trained using training data retrieved from a source known to comprise web pages having the plurality of features and using queries comprising seed examples.

12. The apparatus of claim 1 comprising a communications interface configured to enable the apparatus to be accessed as a web service.

13. The apparatus of claim 1 further comprising a feature extractor configured to extract sentences from the web pages retained by the second classifier, where the extracted sentences are likely to comprise facts.

14. The apparatus of claim 13 further comprising a clustering component configured. to cluster the extracted facts into relation clusters and assign confidence values to the clusters' facts.

15. The apparatus of claim 14 further comprising a mapping component configured to map the relation clusters of extracted facts to an ontology of a knowledge store.

16. A computer-implemented method of retrieving unstructured text from the Internet related to a specified domain, the method comprising:
   accessing training data comprising unstructured text related to the specified domain, the training data having a plurality of features, the unstructured text being separated from structured data and semi-structured data;
   training a first classifier using the training data including the unstructured text related to the specified domain and the plurality of features;
   using the trained first classifier to classify unstructured text having the plurality of features, to obtain unstructured text examples related to the domain;
   using the unstructured text examples to retrieve, from the Internet, only similar examples that include text that is unstructured and do not have at least one of the plurality of features of the training data;
   training a second classifier using at least some of the similar examples,
   retrieving additional unstructured text from the Internet; and
   using the second classifier to classify the additional unstructured text as being related to the specified domain or not.

17. The method of claim 16 comprising assigning confidence values to the similar web pages to indicate likelihood of being relevant to the specified domain and training the second classifier using web pages selected according to the confidence values.

18. The method of claim 16 comprising identifying the similar web pages from inbound links of web pages classified by the first classifier.

19. The method of claim 16 comprising identifying the similar web pages from a cascade of inbound links of web pages classified by both the first and the second classifiers.

20. An apparatus for retrieving unstructured text from the Internet related to a specified domain, the apparatus comprising:
   one or more processors; and
   a memory having instructions stored therein, the instructions executable by the one or more processors to perform operations as
      a first classifier having been trained using training data comprising unstructured text related to the specified domain, the training data having a plurality of features, the unstructured text being separated from structured data and semi-structured data; and
      a similar web page retriever configured to retrieve from the Internet, only web pages that include text that is unstructured and do not have at least some of the plurality of features of the training data, and where the retrieved web pages are similar to web pages classified by the first classifier, the similar web page retriever being configured to assign confidence values to the similar web pages to indicate likelihood of being relevant to the specified domain.

\* \* \* \* \*